(12) United States Patent
Chen

(10) Patent No.: US 6,338,571 B1
(45) Date of Patent: Jan. 15, 2002

(54) RAPID HEAT CONDUCTING STRUCTURE OF AN ELECTRONIC THERMOMETER

(76) Inventor: Min-Ying Chen, P.O. Box 82-144, Taipei (TW)

( * ) Notice: Subject to any disclaimer, the term of this patent is extended or adjusted under 35 U.S.C. 154(b) by 0 days.

(21) Appl. No.: 09/497,636

(22) Filed: Feb. 3, 2000

(51) Int. Cl.⁷ .................................................. G01K 1/00
(52) U.S. Cl. ...................................................... 374/208
(58) Field of Search ................................. 374/208, 169, 374/163; 136/230, 232, 233, 221

(56) References Cited

U.S. PATENT DOCUMENTS

| | | | | |
|---|---|---|---|---|
| 3,592,059 A | * | 7/1971 | Chilton .................... | 374/163 |
| 3,822,598 A | * | 7/1974 | Brothers et al. ............ | 374/169 |
| 4,411,535 A | * | 10/1983 | Schwarzschild ............ | 374/208 |
| 4,538,927 A | * | 9/1985 | Jochemczyk et al. ....... | 374/208 |
| 4,688,949 A | * | 8/1987 | Hatakenaka ................ | 374/208 |
| 4,729,672 A | * | 3/1988 | Takagi ........................ | 374/208 |
| 5,013,161 A | * | 5/1991 | Zaragoza et al. ........... | 374/208 |
| 5,133,606 A | * | 7/1992 | Zaragoza et al. ........... | 374/208 |
| 6,068,399 A | * | 5/2000 | Tseng ......................... | 374/208 |

FOREIGN PATENT DOCUMENTS

JP 03-118432 A * 5/1991

OTHER PUBLICATIONS

Jako, C., "Heat Transfer Sleeve", IBM Technical Disclosure Bulletin, vol. 8, No. 10, Mar. 1966.*

* cited by examiner

*Primary Examiner*—Hezron Williams
*Assistant Examiner*—Stanley J. Pruchnic, Jr.
(74) *Attorney, Agent, or Firm*—A & J

(57) ABSTRACT

A thermometer having a tubular measuring end, a metal head engaged with the tubular measuring end, a sensor arranged within the metal head, and epoxy filled inside the metal head, the metal head being a tubular member with an open end and a closed end, the improvement wherein a tubular metal sleeve made of conducting material is fitted inside the tubular metal head, the tubular metal sleeve having a bottom formed with an inner surface that curves outwardly and an outer surface that curves inwardly the bottom being formed with a center hole and a radial notch, the sensor being positioned in a space which is enclosed by the metal head and the bottom of the tubular metal sleeve, whereby when the tubular measuring end is fitted into the metal head, the tubular metal sleeve will be pushed into the metal head thereby squeezing the gem into the tubular metal sleeve and the tubular measuring end through the center hole and therefore reinforcing engagement between the tubular metal sleeve and the tubular measuring end.

3 Claims, 4 Drawing Sheets

RAPID HEAT CONDUCTING STRUCTURE OF AN ELECTRONIC THERMOMETER

BACKGROUND OF THE INVENTION

1. Field of the Invention

This invention is related to an improvement in the structure of an electronic thermometer and in particular to one which enables the electronic thermometer to show the correct body temperature in a very short time.

2. Description of the Prior Art

As shown in FIG. 1, the conventional thermometer 10 generally includes body portion 11, a tubular metal head 12 engaged with an end of the body portion 11, a sensor 13 fitted inside the tubular metal head 12, electrical connecting wires 14, and epoxy 15 for keeping the sensor 13 in place. When the metal head 12 is in contact with the skin, the temperature of the skin will be transmitted to the metal head 12 which will in turn transmit the temperature to the sensor 13 through the epoxy 15. However, the epoxy 15 is a relatively bad conductor thereby requiring a rather long period of time to attain the correct measurement. Furthermore, the body temperature cannot be evenly transmitted to the sensor 13 thus making it unable to measure the body temperature accurately.

Therefore, it is an object of the present invention to provide an improvement in the structure of a thermometer which can obviate and mitigate the above-mentioned drawbacks.

SUMMARY OF THE INVENTION

This invention is related to an improvement in the structure of a thermometer.

According to a preferred embodiment of the present invention, a thermometer having a tubular measuring end, a metal head engaged with the tubular measurings end, a sensor arranged within the metal head, and epoxy filled inside the metal head, the metal head being a tubular member with an open end and a closed end, the improvement wherein a tubular metal sleeve made of conducting material is fitted inside the tubular metal head, the tubular metal sleeve having a bottom formed with an inner surface that curves outwardly and an outer surface that curves inwardly the bottom being formed with a center hole and a radial notch, the sensor being positioned in a space which is enclosed by the metal head and the bottom of the tubular metal sleeve, whereby when the tubular measuring end is fitted into the metal head, the tubular metal sleeve will be pushed into the metal head thereby squeezing the gem into the tubular metal sleeve and the tubular measuring end through the center hole and therefore reinforcing engagement between the tubular metal sleeve and the tubular measuring end.

It is the primary object of the present invention to provide an improvement in the structure of a thermometer which enables the thermometer to measure body temperature in a short time.

It is still object of the present invention to provide an improvement in the structure of a thermometer which enables the thermometer to measure body temperature accurately.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
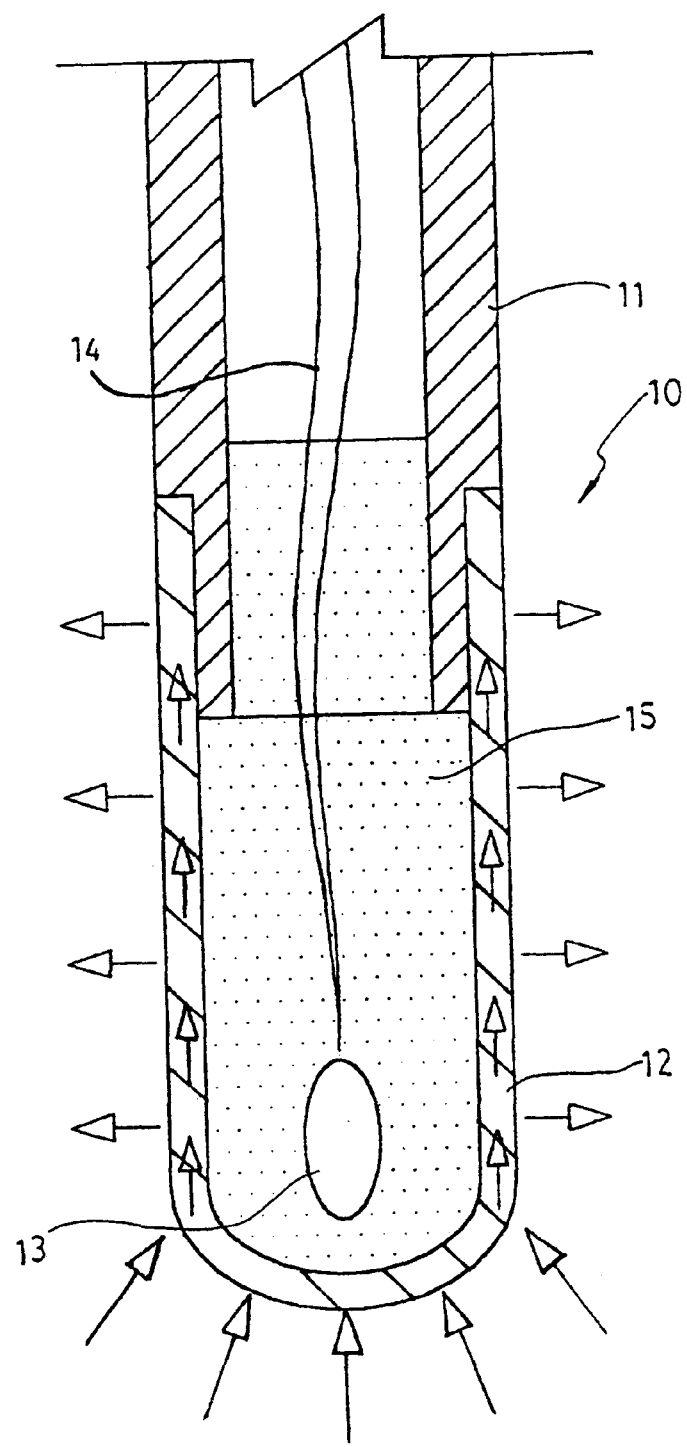
FIG. 1 is a sectional view of a prior art thermometer.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
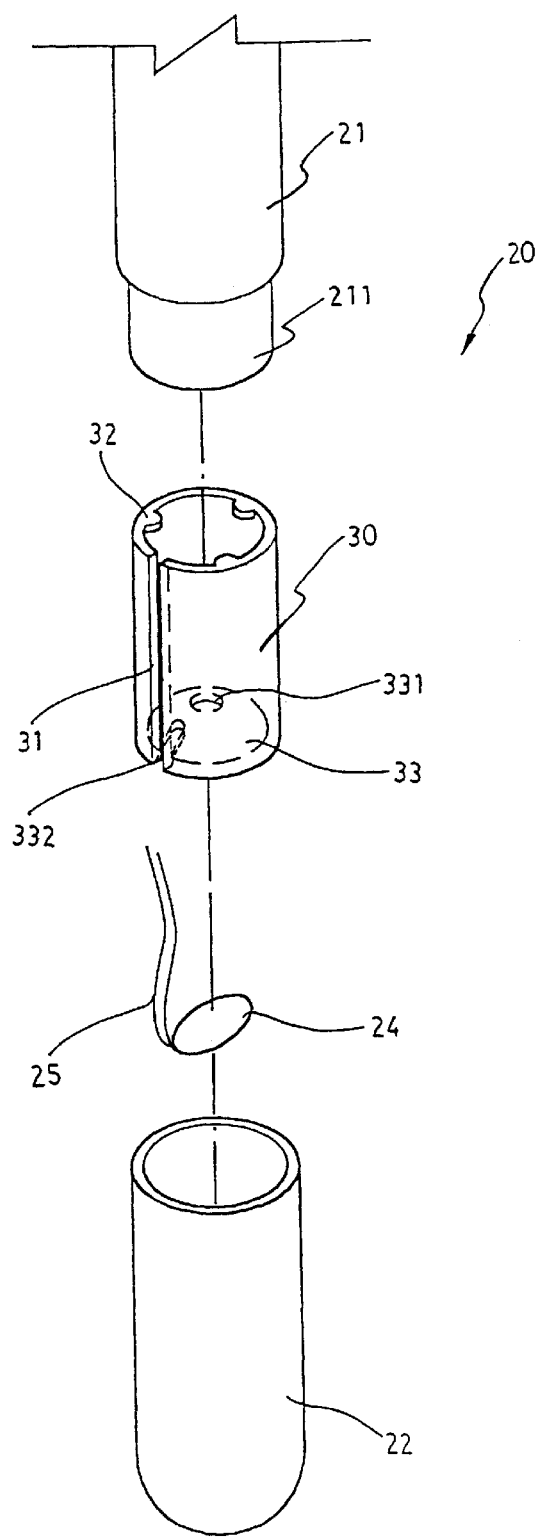
FIG. 2 is an exploded view illustrating the structure of a thermometer according to the present invention.
Figure 3:
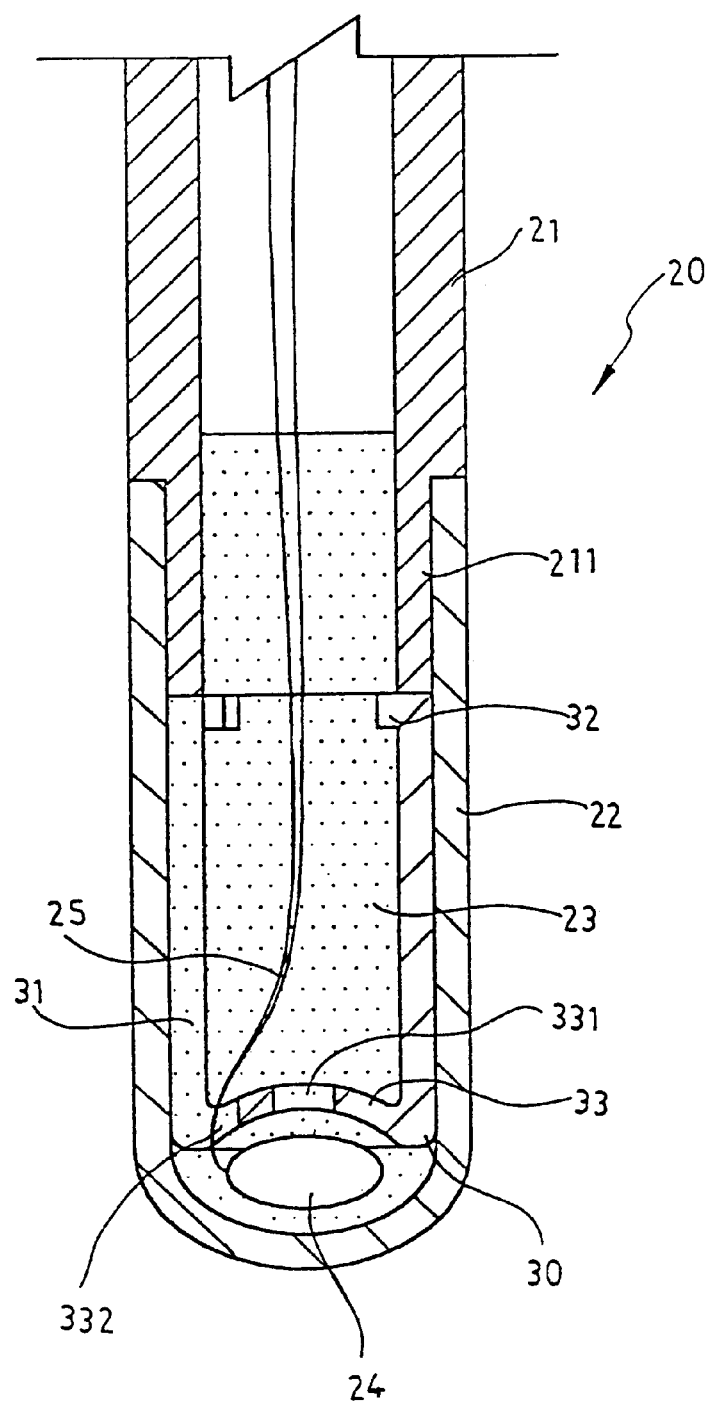
FIG. 3 is a sectional view of the present invention.

With reference to the drawings and in particular to FIGS. 2 and 3 thereof, the thermometer 20 structured according to the present invention comprises a tubular measuring end 21 which is engaged with a metal head 22. The metal head 22 is a tubular member with an open end and a closed end. A tubular metal sleeve 30 made of good conducting material is fitted inside the metal head 22. The tubular metal sleeve 30 is made resilient by forming a longitudinal slot 31 along its length so that the tubular metal sleeve 30 can be snugly fitted into the metal head 22 with different inner diameters. The upper end of the tubular metal sleeve 30 is formed with a plurality of inwardly extending lugs 32. The tubular metal sleeve 30 has a bottom 33 formed with an inner surface that curves outwardly and an outer surface that curves inwardly. The bottom 33 is formed with a center hole 331 and a radial notch 332.

In assembly, the sensor 24 is first fitted inside the metal head 22 and then the epoxy 23 is injected into the tubular metal sleeve 30. Thereafter, the tubular metal sleeve 30 is inserted into the metal head 22 and then the stepped end 211 of the tubular measuring end 21 is fitted into the metal head 22 with the lower end of the former pushing against the lugs 32 of the tubular metal sleeve 30. Meanwhile, the tubular metal sleeve 30 is pushed by the stepped end 211 of the tubular measuring end 21, the epoxy 23 will be squeezed into the tubular metal sleeve 30 and the tubular measuring end 21 through the center hole 331 thereby reinforcing the engagement between the tubular metal sleeve 30 and the tubular measuring end 21 and preventing water from flowing therein. The sensor 24 is positioned under the bottom 33 of the tubular metal sleeve 30. The sensor 24 is connected with electrical wires 25 which extend upwardly into the body portion of the thermometer.

Figure 4:
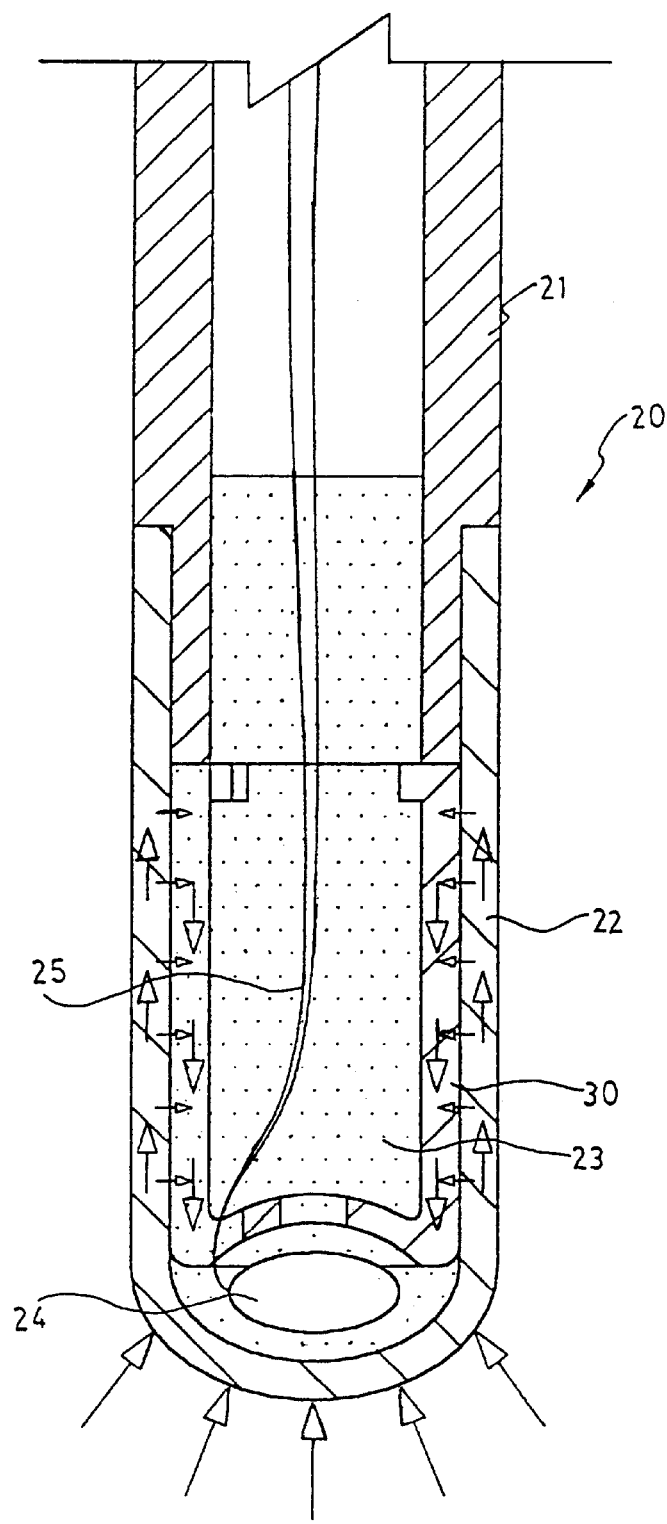
FIG. 4 illustrates the working principle of the present invention.

Referring to FIG. 4, as the sensor 24 is positioned in a space which is enclosed by the tubular metal head 22 and the tubular metal sleeve 30, the temperature of a body will be rapidly and evenly transmitted to the sensor 24 when the metal head 22 is in contact with skin of the body thereby enabling the thermometer to attain the measurement of the body temperature rapidly and accurately.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a thermometer having a tubular measuring end, a metal head engaged with said tubular measuring end, a sensor arranged within said metal head, and epoxy filled inside said metal head, said metal head being a tubular member with an open end and a closed end, the improvement wherein a tubular metal sleeve made of conducting material is fitted inside said tubular metal head, said tubular metal sleeve having a bottom formed with an inner surface that curves outwardly and an outer surface that curves inwardly said bottom being formed with a center hole and a radial notch, said sensor being positioned in a space which is enclosed by said metal head and said bottom of said tubular metal sleeve;

whereby when said tubular measuring end is fitted into said metal head, said tubular metal sleeve will be pushed into said metal head thereby squeezing said epoxy into said tubular metal sleeve and said tubular measuring end through said center hole and therefore reinforcing engagement between said tubular metal sleeve and said tubular measuring end.

2. The tubular metal sleeve as claimed in claim 1, wherein a longitudinal slot is provided along a length of said tubular metal sleeve to make said tubular metal sleeve resilient.

3. The tubular metal sleeve as claimed in claim 1, wherein an upper end of said tubular metal sleeve is formed with a plurality of inwardly extending lugs.

\* \* \* \* \*